United States Patent [19]
Strachan

[11] Patent Number: 6,064,500
[45] Date of Patent: May 16, 2000

[54] HOLOGRAPHIC OPTICAL DEVICE AND METHOD OF MANUFACTURE

[76] Inventor: John Scott Strachan, 6 Marchhall Crescent, Edinburgh EH16 5HN, United Kingdom

[21] Appl. No.: 09/077,825
[22] PCT Filed: Dec. 2, 1996
[86] PCT No.: PCT/GB96/02970
  § 371 Date: Dec. 28, 1998
  § 102(e) Date: Dec. 28, 1998
[87] PCT Pub. No.: WO97/22022
  PCT Pub. Date: Jun. 19, 1997

[30] Foreign Application Priority Data
  Dec. 8, 1995 [GB] United Kingdom .................. 9525103

[51] Int. Cl.[7] ............................... G02B 5/32; G02B 5/18; G02B 1/04; G03H 1/00
[52] U.S. Cl. .............................. 359/15; 359/16; 359/19; 359/569; 359/577; 430/1
[58] Field of Search ................... 359/15, 16, 19, 359/566, 569, 577; 430/1, 2

[56] References Cited

U.S. PATENT DOCUMENTS

| | | | |
|---|---|---|---|
| 4,550,973 | 11/1985 | Hufnagel | 350/3.72 |
| 5,071,210 | 12/1991 | Arnold et al. | 359/19 |
| 5,243,583 | 9/1993 | Ohuchida et al. | 369/44.12 |
| 5,420,947 | 5/1995 | Li et al. | 359/569 |

*Primary Examiner*—Jon Henry
*Attorney, Agent, or Firm*—Ratner & Prestia

[57] ABSTRACT

A method of producing an optical element including a photopolymer layer between two holograms is disclosed. The holograms have the same diffraction spacing and refractive index, but the first hologram has an efficiency of about one-half that of the second hologram, preferably about fifty per cent and ninety-five per cent respectively. The photopolymer is polymerized to adjust the refractive index of the photopolymer until output beams will overlap and cancel each other.

4 Claims, 4 Drawing Sheets

*Fig. 4b*

HOLOGRAPHIC OPTICAL DEVICE AND METHOD OF MANUFACTURE

FIELD OF THE INVENTION

This invention relates to optical devices for producing non-fringing destructive interference of light, and to a method of making and using the same.

BACKGROUND TO THE INVENTION

Light moves through space as an electromagnetic wave. The wave can be envisioned as a series of peaks and troughs moving continuously along a given path at a given frequency. Interference occurs when two waves pass through the same region of space at the same time. Interference between waves can be both constructive and destructive. Constructive interference occurs when the peaks (and troughs) of two waves meet each other at the same time and overlap. These waves are said to be in phase and when this happens the amplitude of the waves at the point of overlap is increased.

Destructive interference occurs when the peas of one light wave meet and overlap with the troughs of a second light wave. When the peaks and troughs meet each other they cancel and the wave is said to be phase cancelled. A perfectly phase cancelled wave has no electromagnetic energy.

Both constructive and destructive interference of light can be demonstrated by a double split experiment whereby light from a single source falls on a screen containing two closely spaced slits. If a viewing screen is placed behind the first screen, a series of bright and dark lines will be seen an the viewing screen. This series of lines is called an interference pattern.

The bright lines of an interference pattern are areas of constructive interference, and the dark lines are areas of destructive interference. The pattern is generated as waves of a particular wavelength enter the two slits. The waves spread out in all directions after passing through the slits so as to interfere with each other. If a wave from each slit reaches the center of the viewing screen, and these waves travel the same distance before they hit the screen, they will be in phase and a bright spot indicating constructive interference will occur at the center of the viewing screen. There will also be constructive interference at each point the paths of two light rays differ by one wavelength or multiples of one wavelength. However, if one ray travels an extra distance of one-half a wavelength or some multiple of a half wavelength, the two waves will be exactly out of phase when they reach the screen, and so a dark band will appear in the interference pattern indicating destructive interference. Thus, you get a series of bright and dark lines in the interference pattern called "fringes".

The double slit experiment is one method of producing destructive interference. However, only a small portion of the source light is cancelled. Another method of producing destructive interference of light has been accomplished by using a beam splitter, mirrors and a laser. This type of device is often referred to as an interferometer.

An interferometer works on the following principle. A laser is used in conjunction with a beam splitter to cause the laser beam to split in two, with a certain percentage of light taking one path and a certain percentage of light taking another path. The path of one of the split beams can be delayed by using amovable mirror such that the beam can be reflected back parallel with the unreflected beam by variable path lengths which can differ by fractions of a wavelength.

The degree of cancellation depends on the "coherence length" of the laser and the narrowness of the chromatic line. For these reasons, a laser of extremely high quality is required to produce a significant degree of cancellation. However, no laser produces purely monochromatic light and a fringe is produced regardless of the degree of cancellation. In order to produce a perfectly phase-cancelled non-fringing collinear beam, destructive interference must occur over all incident wavelengths and phases of the entire bandwidth of the incident light source, all of the light rays emitted by the source must be parallel, each photon in the beam must be paired with another photon having the exact same wavelength, and the path lengths of half of the photons must be delayed by a multiple of exactly one half wavelength with respect to the path lengths of their paired photon partners.

No conventional arrangement can achieve this result. Although a pair of semi-silvered mirrors could be placed such that one specific wavelength could be made to interfere it cannot be correct for all wavelengths. A refractive element could be used to adjust the delay. However, as this only works for non-zero incident angles, the result would be that each wavelength would be travelling along non-parallel paths whose angle can only be increased by the mirrors so the beam could never form a collinear beam and so individual photons can never pair.

Accordingly, it is an object of the invention to provide a highly efficient optical device which will produce an output beam which is non-fringing, collinear and phase cancelled such that: (a) destructive interference occurs for all incident wavelengths and phases over a bandwidth of at least 1% plus or minus the center wavelength of a coherent light source such as a laser; (b) all of the output beam's light rays are parallel;(c) each photon in the output beam is paired with another photon having the exact same wavelength; and, (d) the path lengths of half of the photons are delayed by a multiple of exactly one half wavelength with respect to the path lengths of their paired photon partners.

SUMMARY OF THE INVENTION

The invention achieves the above-described object and other objectives in the following way:

An optical device is provided which consists of a holographic element ("hologram") and a refractive optical material of a specifically selected refractive index. The hologram is constructed with a diffraction grating that will induce a wavelength-dependent angle of diffraction for an incident optical beam of a given entry angle. The assembly of the hologram and refractive optical material are such that the wavelength-dependent variation in refraction angle induced by the refractive material will be equal and opposite the wavelength-dependent variation in diffraction angle induced by the hologram such that the angles mutually cancel for each wavelength of the incident optical beam.

In another embodiment, the previously described optical device is combined with a second hologram such that the optical device consists of two holograms and an intervening (refractive) optical material. Both holograms are constructed with similar diffraction gratings that will induce the same wavelength-dependent angle of diffraction for an incident optical beam of a given entry angle and both holograms are constructed with the same average refractive index. However, each hologram has a predetermined efficiency which is different from the efficiency of the other hologram. The first hologram is preferably about 50% efficient or half as efficient as the second hologram and the second hologram is preferably close to 100% efficient.

The first hologram is positioned parallel to and spatially separated from the second hologram by an intervening optical material. The intervening optical material is essentially sandwiched by the two holograms. The intervening optical material has a specifically selected refractive index which is different from the average refractive indices of the holograms. The angle of refraction induced by the intervening optical material is also wavelength dependent.

By establishing a particular refractive index for the intervening optical material, a wavelength-dependent variation in refraction angle induced by the intervening optical material can be made equal and opposite to the wavelength-dependent variation in diffraction angle induced by the first hologram such that the angles mutually cancel for each wavelength of an incident optical beam having a given entry angle for the first hologram of the optical device.

Because the first hologram is close to 50% efficient, approximately 50% of the incident optical beam will pass through the hologram undiffracted and approximately 50% of the beam will be diffracted such that two beams will be produced by the first hologram. Both beams will traverse the intervening optical material and impinge upon the second hologram at different angles. The diffracted beam will pass through the second hologram affected only by the change in refractive index whereas the undiffracted beam will interact with the diffraction grating of the second hologram and be diffracted at an angle such that both beams will exit the second hologram parallel to each other.

By small adjustments of the second hologram, the two exit beams can be made to overlap and the originally undiffracted beam can be intercepted by the second hologram such that it takes a path some multiple of a half wavelength different from the path of the originally diffracted beam. The combined beam will be phase cancelled for all incident wavelengths and phases over a bandwidth of at least 1% plus or minus the center wavelength of the incident optical beam.

Both the overall delay of the diffracted beam and the overall efficiency of diffraction for the holograms can be adjusted by simply changing the angle of incidence on the first hologram. As the angle of incidence is changed, a greater or lesser percentage of the incident light can be cancelled. The fundamental difference between this effect and that of a simple fixed delay on one of the beams is that as the angle of the total element becomes aligned with the ideal, a greater percentage of the incident light will pass through the defined path. All of the light passing through the defined path will result in a perfect cancellation. So, whereas in a conventional interferometer a series of fringes will be seen, the output of the element as described in this invention will produce a single fringe or beam with a greater or lesser percentage of cancellation proportional to the amount of the incident beam allowed to take the prescribed path.

Another aspect of the invention includes methods for producing the previously described optical device. In the production of the device, two lasers are used to generate a mixed beam of collinear light consisting essentially of two different wavelengths. The mixed beam is directed at one of the holograms at a given entry angle such that two diffracted beams exit the hologram at different angles and project onto a photo-sensor array a distance L from the exit side of the hologram. The distance between the projection points of the two diffracted beams is measured at the array.

An intervening optical material having a long dimension equal to L and a selected initial refractive index is positioned between the photo-sensor array and a test photopolymer which has the same average refractive index as the hologram such that its long dimension is perpendicular to the test photopolymer and the array. The same mixed beam is directed at the test photopolymer such that two exit beams are projected by the intervening optical material onto the array. The refractive index of the intervening optical material is then adjusted by polymerization. As the refractive index of the intervening optical material changes, the distance between the projection points of the refracted beams changes. The polymerisation of the intervening optical material is stopped at that point when the displacement between the projection points of the refracted beams measures the same as the displacement between the projection points of the diffracted beams.

The intervening optical material is then secured to the first hologram such that its short dimension is perpendicular to the hologram. A second hologram, twice as efficient as the first hologram, is positioned at the face of the intervening optical material opposite the first hologram. An incident optical beam having a suitable entry angle is directed at the first hologram so that two exit beams are produced by the second hologram. Slight rotational and lateral adjustments of the second hologram are made until the beams overlap and a position of maximum cancellation is achieved.

The optical device described above overcomes the limitations associated with interferometers in that it can produce a non-fringing phase-cancelled beam for all incident wavelengths and phases over a bandwidth of at least 1% plus or minus the center wavelength of a coherent light source such as a laser. Furthermore, the device disclosed herein represents a simple and reliable method for the creation of a phase-cancelled collinear beam even when the source laser is of relatively low quality and power and has a limited coherence length. The production of such a device allows research into the properties of phase-cancelled collinear beams to be undertaken at moderate cost and is a basis for the generation of such beams for other scientific and commercial applications.

Other objects, features and advantages of the invention will become apparent from a reading of the specification when taken in conjunction with the drawings.

DETAILED DESCRIPTION OF THE PREFERRED EMBODIMENTS

For clarity, a brief background of lasers and holograms and relevant terminology is provided.

The term "laser" is an acronym for Light Amplification by Stimulated Emission of Radiation. To generate a laser light source, a medium containing a distribution of similar atoms in a solid or gaseous transparent suspension is generally heated, or otherwise excited, to produce a majority of atoms at an excited state with electrons in high orbits outside the atom's "ground" or unexcited state. Introduction of a beam of light into the medium results in the absorption and re-emission of photons from the excited atoms. Because the atoms are at a threshold condition of excitation, the introduction of a photon causes the atom to absorb and re-e it the incident photon along with a second photon of the same wavelength and phase. This process tends to cause a "cascade" as each newly emitted photon stimulates other atoms to absorb and emit, thus amplifying the light. In an ideal world, the resulting light from such a system would be coherent so that all the light would be of the same phase and monochromatic in that it would consist of a single wavelength. In practice however, the atomic excitation is not perfect and several different energy states are stimulated among atoms in the suspension. This yields a narrow spectrum of light, often in a temporally spaced rhythm known as "mode hopping", as a majority of photons shift from one wavelength to the next. For various reasons the refractive index of the stimulated medium is often inconstant, and the thermal excitation tends to cause the phase to wander over time. The time period of such wandering divided into the speed of light defines the coherence length of a laser beam. This can vary between a few microns to many meters depending on laser type.

Figure 1:
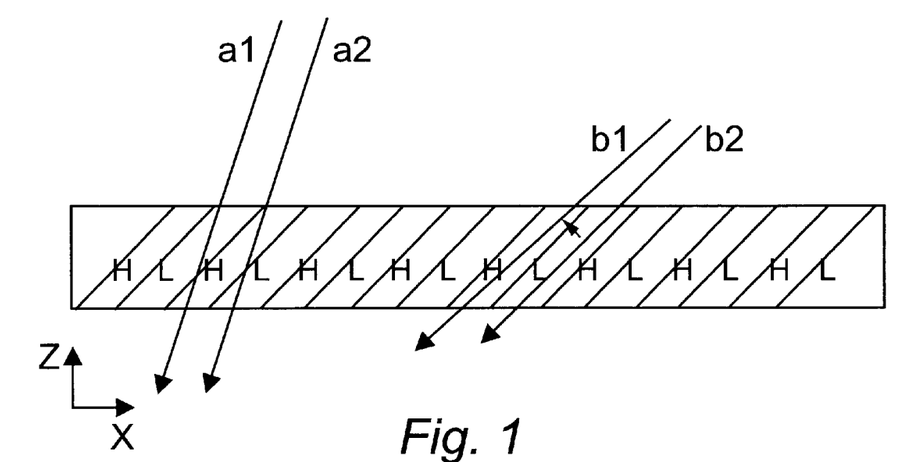
FIG. 1 is a diagrammatic cross-section of an overly simplified photopolymer hologram which is provided for the purpose of illustrating the potential interaction of light with the differing refractive indices of a photopolymer hologram as discussed in the background section of the following detailed description.

Holograms and their method of manufacture are well known in the art. A hologram is essentially a diffraction grating. A diffraction grating is created when the photopolymer is exposed to a reference beam of angle A and an incident beam of angle B. The diffraction grating, having been created by the passage of light at specific angles, tends to form as a mutually interactive three dimensional lattice which represents the desired fringe pattern only at a specific incident angle of the replay beam. Light entering the hologram with the same angle as the replay or reference beam will interact with the differential refractive indices of the diffraction grating and be diffracted at a new wavelength dependent angle. Any other angle will tend to miss the differential refractive indices of the diffraction grating and instead interact with the sum of the refractive indices of the hologram, as if in fact the hologram were all of a single average refractive index. FIG. 1 shows the effect: note that paths a1 and a2 pass through more or less equal amounts of low (L) refractive index and high (H) refractive index, whereas at a certain critical angle, paths b1 and b2 pass through differential refractive indices.

The efficiency of a photopolymer hologram is measured by comparing the incident and non-interacted light to the light that is transmitted by diffraction in the intended direction of the holographic optical element. The extent to which light is diffracted depends on how extensive the diffraction grating is present, The degree to which the diffraction grating is present is dependent on the extent to which polymerization and crosslinking of the holographic photopolymer is allowed to proceed. Polymerization and crosslinking of the photopolymer occurs when the photopolymer is exposed to the light source used to create the diffraction grating and during subsequent exposure to ultraviolet light and thermal curing. By controlling the extent of polymerization and cross-linking, one can control the degree to which the diffraction grating is present and thus the efficiency of the hologram. The efficiency of holograms made from metal-based emulsions such as silver halide can be varied by varying the grain size of the emulsion.

The phenomenon of holographic efficiency is used in the described device to modify the percentage of light that is forced to take the phase cancelling path, since only the light which passes through the differential refractive indices will result in an interference pattern and thus result in a diffracted path. In practice the H and L portions of the hologram are less well defined due to incomplete polymerisation and so the efficiency is reduced even at the ideal angle as explained in the polymerisation discussion above.

Also fundamental to a full understanding of the invention is the phenomenon and properties of refraction. As a light ray passes through two optical mediums having different refractive indices and the light ray is at any angle other than perpendicular (normal) to the interface between the optical mediums, it will undergo a change of angle becoming more acute if the transition is from a lower to a higher index and more oblique if the transition is from a higher to a lower index. This phenomenon can be easily understood if it is remembered that the higher the refractive index of a medium the slower light travels through that medium. Thus, as a light ray enters a medium of higher refractive index at an angle, the light ray will be slowed down and thus bend toward the slowed side. The angle of bend is dependent on the difference in the refractive indices of two optical mediums and the wavelength of the incident light beam.

If a beam of light passes through an intervening optical material having a different refractive index compared to the refractive index of the medium the beam is travelling in (an example would be light passing through a window), the change in refractive index at the entry to and exit from the intervening optical material will be equal and opposite such that when the beam enters the intervening optical material the beam will bend one direction, and when the beam exits the intervening optical material the beam will be bent back in the opposite direction an equal amount so that the entry beam and exit beam will be parallel. However, the point at which the beam exits the intervening optical material will be shifted laterally compared to where the beam would have exited had the original entry beam passed straight through the intervening optical material unrefracted. The amount of lateral shift is dependent on the angular shift within the intervening optical material and the distance between the entry and exit.

In this invention, the efficiency of a second hologram is set as close to 100% as possible and the efficiency of a first hologram is set at half the efficiency of the second hologram, close to 50%. When a coherent beam of light of a given entry angle enters the first hologram, approximately 50% of the beam will pass through the first hologram affected only by the change in refractive index and approximately 50% of the beam will be diffracted. As both beams enter the intervening optical material they encounter another change in refractive index which induces a wavelength-dependent change in angle for each beam. A refractive index for the intervening optical material is selected which induces a wavelength-dependent change in refraction angle that is equal and opposite the wavelength-dependent change in diffraction angle induced by the first hologram so that the angles mutually cancel for each wavelength of the diffracted beam. Thus, the angular path of the diffracted beam across the intervening optical material is essentially opposite its angular path of exit from the first hologram.

When the diffracted beam exits the intervening optical material and enters the second hologram the change in refractive index is equal and opposite the change in refractive index which occurred as the diffracted beam left the first hologram and entered the intervening optical medium. This must be since the average refractive indices of the two holograms are the same. Thus, the diffracted beam will be refracted by the second hologram such that its angle of departure from the second hologram will be parallel to its angle of departure from the first hologram (the original angle of diffraction). Note that the diffracted beam would have an improper entry angle with respect to the diffraction grating of the second hologram and would pass through the second hologram affected only by the change in refractive index.

The undiffracted bean which exits the first hologram passes through both the first hologram and intervening optical material and into the second hologram affected only by the change in refractive index. Therefore, the undiffracted beam exits the intervening optical material and enters the diffraction grating of the second hologram by a path which is shifted laterally but otherwise parallel with the path it had as it entered the first hologram. Thus, the undiffracted beam will have the correct entry angle to interact with the differential refractive indices of the diffraction grating of the second hologram. Because the second hologram is close to 100% efficient, nearly all of the undiffracted beam will be diffracted and thus exit the second hologram parallel to the originally diffracted beam.

By slight movements of the second hologram, the two exit beams can be made to overlap over a large portion of the diameter of their beams and the originally undiffracted beam can be intercepted by the second hologram such that it takes a path some multiple of a half wavelength different from the path taken by the originally diffracted beam. The resulting combined beam will be phase cancelled for all wavelengths and phases over a bandwidth of at least 1% plus or minus the source center wavelength of the incident optical beam.

Figure 2:
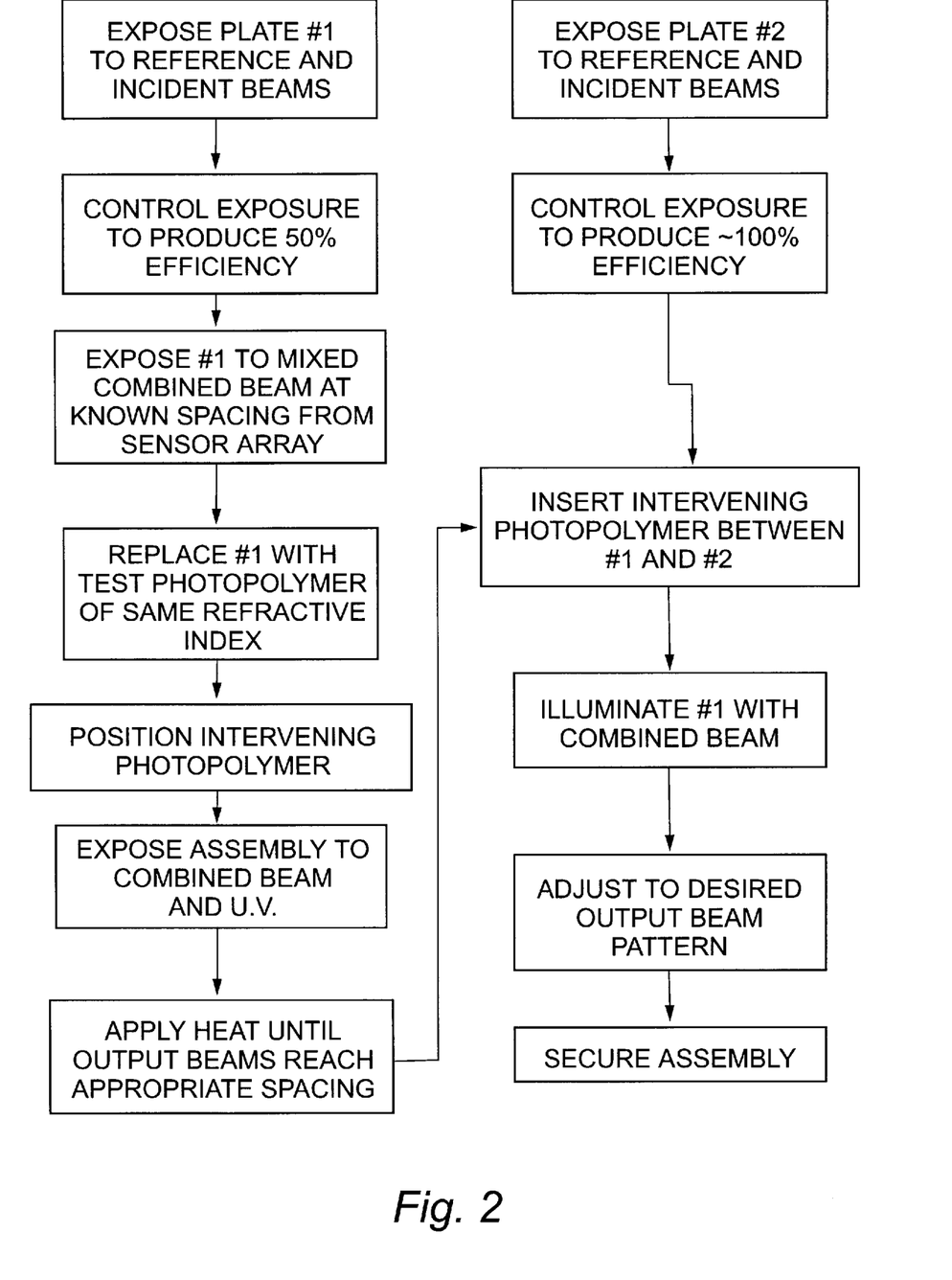
FIG. 2 is a flow chart of a method of producing a device in accordance with the present invention.

The first and second holograms are constructed as will now be described. The sequence of operations is summarised in the flowchart of FIG. 2.

The diffraction grating of the first hologram is created by exposing a holographic plate or film to a reference beam of angle A and an incident beam of angle B. In the prototype invention, an argon ion laser is used as the light source, however, different lasers can be used relative to the characteristics of the holographic film one is using.

The laser is mounted on a laboratory optical bench and a beamsplitter and mirrors are used to cause the laser beam to split and project upon the holographic plate as a reference beam and incident beam having the correct angles. In the case of the prototype, the reference beam angle was approximately 30 degrees from perpendicular to the hologram and the incident beam angle was approximately 2–3 degrees from perpendicular. These angles can be varied as long as neither beam is exactly perpendicular to the hologram or so close to horizontal with the plane of the hologram that the beams cannot interact with the hologram to form a diffraction grating.

The efficiency of the first hologram is set close to 50% preferably by controlling the exposure of the photopolymer to limit the polymerisation by that amount or in the case of a silver halide hologram by reducing the contrast to half of that achievable. By measuring the difference in intensity between the output beams and the input beams with a photo sensor, one can determine the point at which the desired efficiency is achieved. The second hologram is manufactured using the same reference and incident beam at the same angles but with an efficiency as near 100% as is practical or to the limit achievable with a silver halide hologram. Modern photopolymers typically allow an efficiency of up to 97% once a series of iterative exposure tests and thermal curing tests have been completed. Experience shows that a consistent exposure and bake for a particular photopolymer from a particular manufacturers batch can be determined after a few iterations for any chosen polymerisation efficiency and therefore for any chosen holographic diffraction efficiency.

Since the consistency of the manufacture of photopolymers is not yet ideal the calculation of resultant diffraction and refraction ratios of the hologram is impossible thus pre-determination of a specific refractive index for the intervening optical material is currently impossible. The solution to the problem is to exploit the thermal curing properties of photopolymers as described below.

Figure 3:
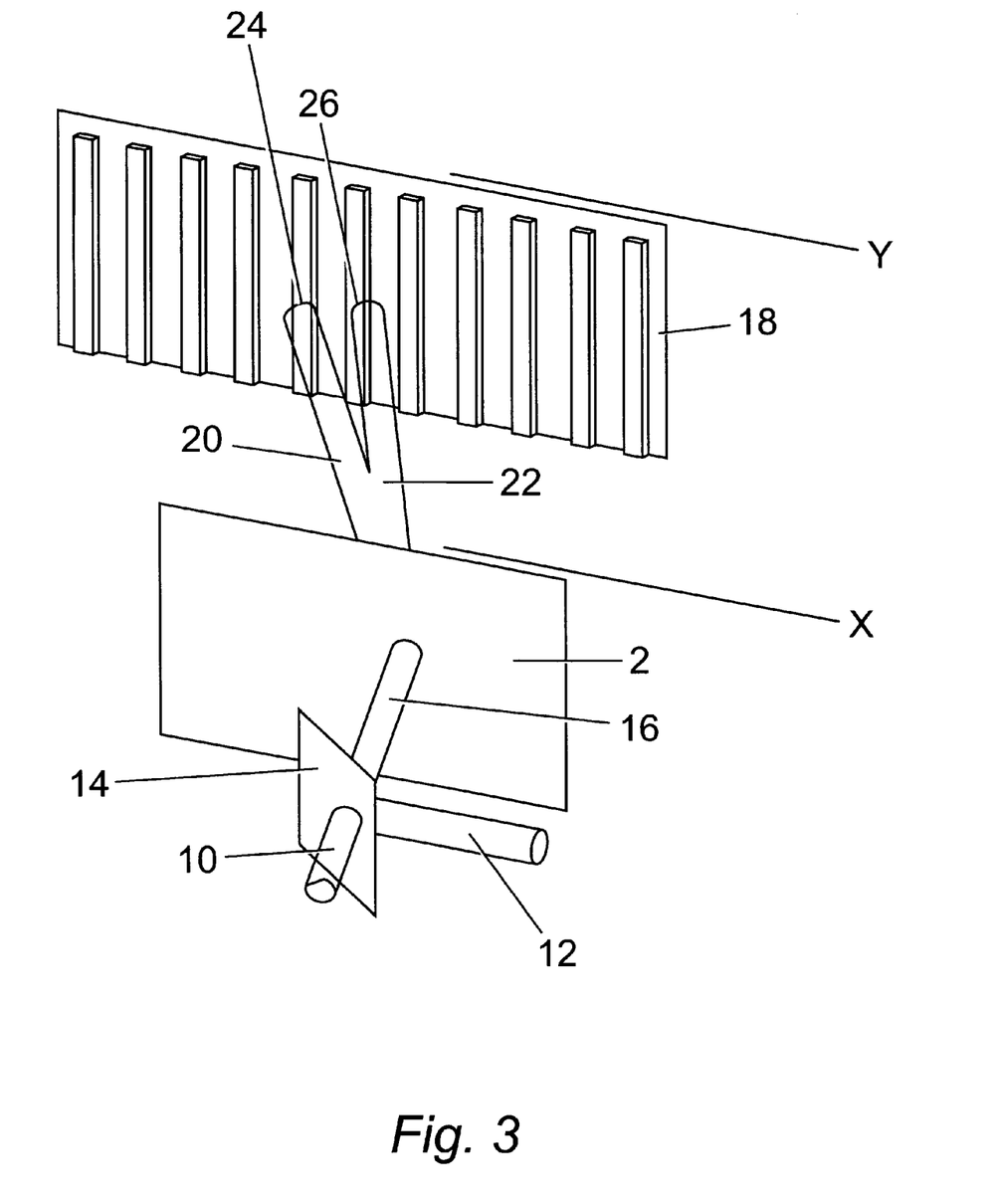
FIG. 3 is a schematic perspective view illustrating the method.
Figure 4A:
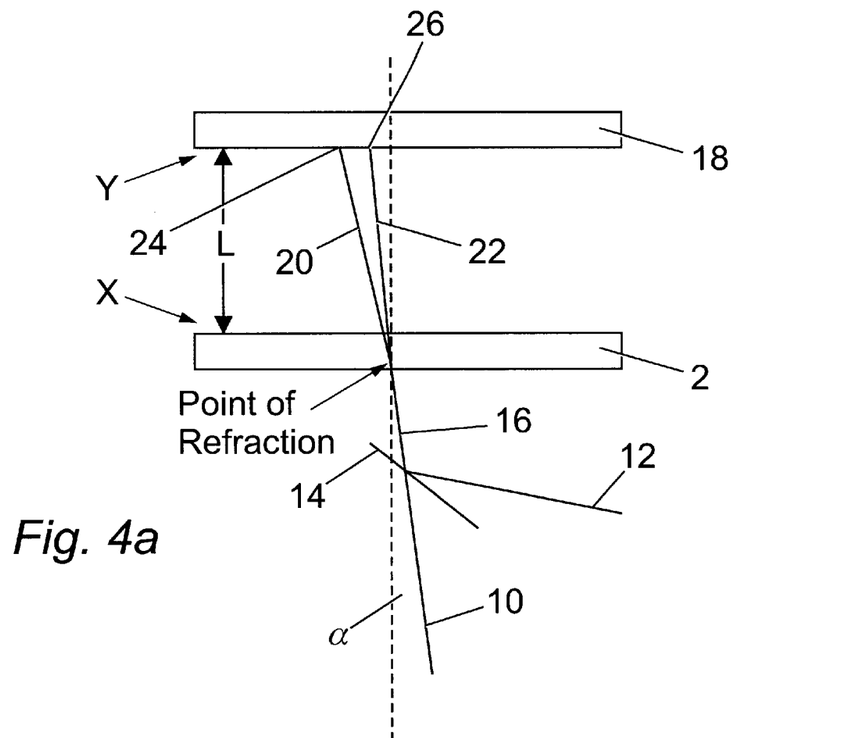
FIGS. 4A and 4B are diagrammatic plan views illustrating the method.

Referring to FIG. 3 and FIG. 4A, a pair of lasers with a wavelength difference of a few nanometers are set up to provide beams 10 and 12 to a beam splitter 14, and thus to produce a single collinear mixed beam 16 through an oven (not shown) and thence to project at a screen or, preferably, at a sensor array 18. The hologram 2 which is 100% efficient is placed in the path of the beam 16 at point X such that the beam 16 impinges on the hologram 2 at the reference angle α. Since the incident beam 16 is essentially composed of two different wavelengths of light and the angle of diffraction for a given hologram is wavelength dependent, two exit beams (20 and 22) will be produced by the hologram 2. The wavelength of light in one beam will be shorter than the wavelength of light in the other beam and both beams will be projected on the sensor array 18 as two projection points 24 and 26. The difference between the centers of the two projection points 24 and 26 is measured by the photosensor array at point Y and recorded.

The hologram 2 is removed and replaced at X with a test photopolymer 28 (FIG. 4B) which has been exposed to the same total energy in Joules of incoherent light as the hologram 1 has been exposed to coherent light, such that the average refractive index of the test photopolymer 28 equals the average refractive index of the hologram 1. An intervening optical material in the form of an uncured photopolymer 30 is placed between the test photopolymer 28 and the sensor array 18. The differential between the refractive index of the hologram 2 or test photopolymer 28 and the refractive index of the intervening optical material 30 will define the angle of refraction for a given wavelength at the interface between the first hologram 1 and the intervening optical material 30 (interface 32 in FIG. 5), and it is this angle's dependence on wavelength that this set up is designed to define.

The refractive index of the intervening optical material 30 is determined by the structure and density of the photopolymer which is used as to make the intervening optical material 30. The structure and density of this photopolymer can be varied depending on the amount of light to which the photopolymer and its activating dye is exposed to and also to the subsequent crosslinking induced by exposure to an elevated temperature. By exposing the photopolymer to a suitable amount of light and then monitoring the refractive index during elevated temperature curing (cross linking), a specific refractive index can be achieved.

The actual refractive index will change slowly proportional to the time and temperature. It can be frozen at a specific value by dropping the temperature below a critical temperature at which cross linking occurs for a given photopolymer. The process is made difficult by the fact that the refractive index changes in only one direction and by the fact that the curing process can not be instantaneously stopped. However, one can experiment with a sample of the same photopolymer and by carefully observing the change in angle after the temperature is dropped below the curing point, one can easily see by how much in advance of the desired angle the curing temperature must be reduced to the critical temperature. The critical temperature of the photopolymer will represent the maximum operating temperature of the finished element since further exposure to elevated temperatures will cause the refractive index to change from the desired refractive index previously established by the above-described process of polymerization and cross-linking.

Almost any photopolymer of sufficient range of refractive index may be used to make the intervening optical material, including the same photopolymer used for the production of the holograms. All that is required of it is that it can be cured to a mean refractive index that is different from the average refractive index of the holograms and that it is homotropic in that the speed of light in this material is the same in all directions. Low cost photopolymers such as the ultraviolet curing cements made by the Loktite Corporation have been used for this purpose. Generic dye activated photopolymer is also a suitable material and is available from several sources. The formulation can be determined from various published papers on the subject.

The initial refractive index of the photopolymer which is to be used for the intervening optical material 30 is made higher or lower than the average refractive index of the hologram 1 depending on the change of refractive index which is necessary to bend the diffracted exit beam in the desired direction. All that is important is that an initial refractive index is chosen for the intervening optical material 30 such that the change of refraction between the first hologram 1 and the intervening optical material 30 will cause the exit beam from the hologram 1 to bend back opposite its path of deflection as it passes through the intervening optical material. Since the diffraction angle for the hologram 1 is known, a photopolymer can be chosen having the necessarily higher or lower initial refractive index. The photopolymer to be used for the intervening optical material 30 has typically been treated with sufficient ultraviolet light that the photopolymer is converted to a solid having an initial refractive index as previously described.

The manufacture of the intervening optical material 30 is as follows:

Referring again to FIGS. 3 and 4, the hologram 2 at position X is removed and replaced with the test photopolymer 28. A photopolymer which is to be used for the intervening optical material 30 is prepared so as to have a long dimension L and a narrow dimension M. Dimension L is made equal to the distance X-Y in FIGS. 3 and 4. Distance X-Y equals the distance between the test photopolymer 28 and the sensor array 18 and is the same as the distance between the hologram 1 and the sensor array 18. In the prototype, a photopolymer 6 cm long and 0.3 mm wide has been used to make the intervening optical material 30. However, as will be explained later, handling and construction considerations are the main criteria for the actual size of dimensions M and L.

One end of photopolymer 30 is placed in contact with the sensor array and the other end is placed against the test photopolymer 28 at point X (FIG. 4E) so that dimension L of photopolymer 30 is perpendicular to the sensor array 18.

Figure 4B:
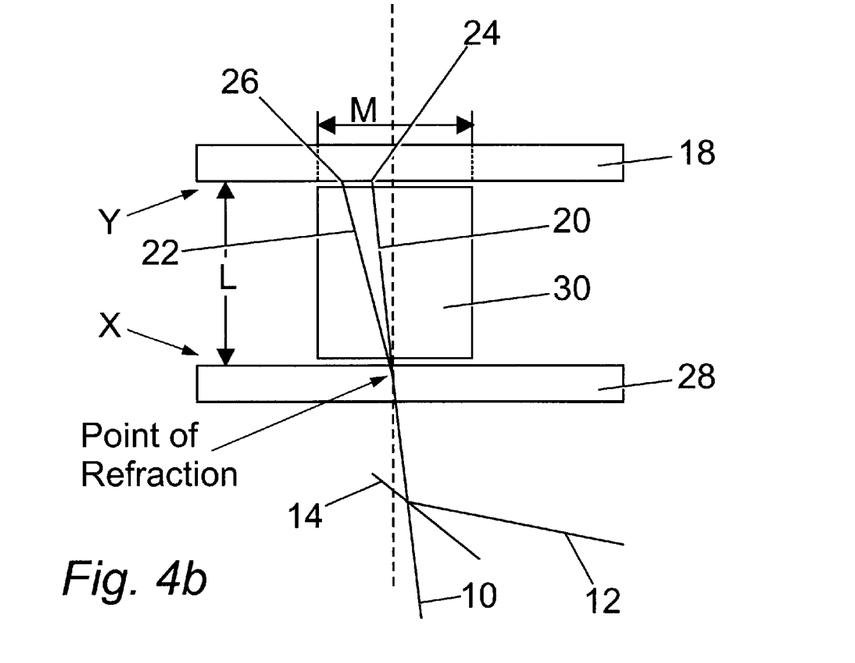

When the pair of lasers are energized, a collinear beam 16 is projected into the oven through the test photopolymer 28 and photopolymer 30. At the exit side of photopolymer 30 the shorter wavelengths of the two lasers will be laterally displaced relative to the longer wavelengths such that two beams 20 and 22 will exit photopolymer 30 and impinge on the sensor array 18 as two projection points 24 and 26 (FIG. 4B). By placing photopolymer 30 with its greater dimension L perpendicular to the array 18, a more easily measured displacement of the projection points of the two beams can be made at Y than would be the case if dimension XY were to be made equal to dimension M which would be the operational dimension of photopolymer 30.

Initially, ultraviolet light is used to cure photopolymer 30. As photopolymer 30 cures, the progressive change in the difference between the centers of the projection points 24, 26 of the two beams 20 and 22 can be measured at the sensor array 18. Initially, the projection points 24, 26 will be close together. As the curing process starts, the projection points 24, 26 will begin to spread. As the distance between the projection points 24, 26 begins to approach the desired spread, the ultraviolet light is turned off and the oven, which has been set to the photopolymer manufacturer's recommended curing temperature, is turned off. As previously mentioned, the curing process cannot be instantaneously stopped. Therefore, the oven is turned off far enough in advance such that when the curing process finally stops, the centers of the projection points 24, 26 will measure exactly the same distance as that measured between the centers of the projection points produced by the first hologram 1 thus establishing the refractive index of photopolymer 30.

At this point, the linear shift of the projection points 24, 26 of the two beams 20, 22 which were angularly shifted due to the change of refractive index between the test photopolymer 28 and photopolymer 30 is made equal to the linear shift caused by the equal but opposite angular shift of the beams 20, 22 which were diffracted by the hologram 1 as previously measured. Thus, in the finished optical device, the change in refractive index between the first hologram 1 and the intervening optical material 30 will be such that the wavelength-dependent variation in refraction angle induced by the refractive material 30 will be equal and opposite the wavelength-dependent variation in diffraction angle induced by the first hologram 1 such that the angles mutually cancel for each wavelength of the incident optical beam.

Figure 5:
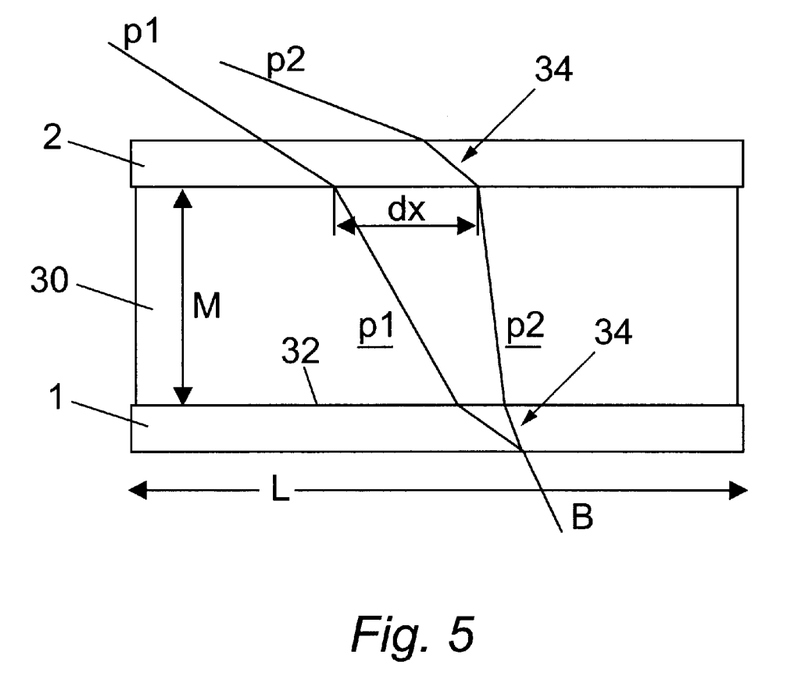
FIG. 5 is a diagrammatic cross-section illustrating a device in accordance with the invention.

The assembly of FIG. 5 can now be made.

The intervening optical material (photopolymer 30) is inserted with dimension M between the two holograms 1 and 2. The hologram 1 which is 50% efficient is stabilized in its alignment with respect to the intervening optical material. A laser beam B having the correct entry angle to interact with the differential refractive indices of the diffraction grating of the hologram is directed at the stabilized hologram 1 so two output beams, p1 and p2 of FIG. 5, are produced by the optical device. Reference 34 indicates holographic deflection. Both beams exit the intervening optical material 30 at different angles. Beam p1 represents the diffracted beam.

A small dab of UV curing cement is applied to either the exposed face of the intervening optical material 30 or the second hologram 2. As the second hologram 2 is pushed up against the intervening optical material 30, it is pivoted about the axis of the exiting beams until beams p1 and p2 line up as a single spot on a target such as a frosted glass or a CCD. Then, the second hologram 2 is adjusted laterally. As the second hologram 2 is moved laterally (perpendicular to dimension M), the beam will be seen to modulate between light and dark. Upon closer examination of the spot, the two beams p1 and p2 can be seen overlapping as two circles on the target. This can be facilitated by magnifying the beam projection point with a lens (taking the usual precautions for eye protection) or connecting the CCD to a monitor.

The desired condition is to achieve both maximum overlap of the beams p1 and p2 and maximum cancellation simultaneously. Beam p2 which is diffracted by the second hologram 2 tends to have a slightly harder edge than beam p1. This makes aligning the overlap easier since, in practice, beam p1 will form a slight halo or "corona" around beam p2 making it easy to see when the beams are ideally aligned and maximum cancellation (destructive interference) has been achieved. This adjustment is possible because the diameters of the beams are large with respect to the wavelength and by adjusting the hologram laterally, that portion of beam p2 taking a path some multiple of a half wavelength longer than the beam p1 can be intercepted. The differential required between the two beam paths. occurs many times within the diameter of the combined beams so the second hologram can be adjusted over several destructive peaks until the best position is chosen.

Once the operator is satisfied that the optimum condition is achieved, the device as a whole is exposed to ultraviolet to cure the cement. Various manufacturers make such cement and the ideal curing exposure will be as recommended by the manufacturer of the cement used.

The difference between several peak cancellations in terms of beam overlap is small and so the overall performance of the device will only vary a few fractions of a percent from optimum even if the device is quite grossly misaligned in terms of beam overlap. Also, even if the cancellation point is not perfect, a small adjustment in the entry angle of the replay beam will correct it to some extent. Por maximum efficiency, the positioning of the second hologram 2 should be performed carefully. For example, if the device is to be used as the aperture for a spatial filter in a powerful laser system, it is naturally important to insure that as little power as possible either bypasses the arrangement or is absorbed by it.

The adjustment of the second hologram 2 can be accomplished by a micromanipulator such as would be used for the adjustment of a microscope stage. An alternative method is to use a piezoelectric transducer as a component of a suitably constructed jig. A piezoelectric transducer changes dimension proportional to an electric field. The holograms 1 and 2 and intervening optical material 30 can be held permanently in place by a clamp as an alternative to UV curing cement.

Because of the relationship between the holograms 1 and 2 and the intervening optical material 30 it is now possible to vary the incident wavelength by up to 2% while still maintaining perfect temporal cancellation of the beam. Actual intensity cancellation is less than perfect since the holographic polymerisation or halide contrast efficiencies are never perfect.

The ability of the device to cancel a wide bandwidth of incident light is explained below with reference to FIG. 5.

The wavelength of the incident light changes dimension dx such that the longer the wavelength the greater dx. Thus the path length of p1 and the path length of p2 will be wavelength dependent. By defining the mean value of dx it is possible to set the difference between path p1 and path p2 as an integer multiple of a half wavelength for the mean wavelength of the laser. If that multiple is odd, i.e. 1,3,5,7 etc., then the beams of p1 and p2 will cancel. Further, since the differential of p1 and p2 is defined by dx which is wavelength dependent, it can be seen that the delay of p2 can be set to consistently equal one half wavelength over any wavelength that is interacting with the optical device and within a range such that dx does not exceed the diameter of the beams p1 and p2. Defining the mean value of dx and setting the difference between path p1 and path p2 as an integer multiple of a half wavelength for the mean wavelength of the laser is accomplished simply by making small adjustments of the second hologram 2 as previously described. As the correct positioning of the second hologram 2 is established, the individual delay for each wavelength is made proportional to its wavelength.

Dimension M is important only as to how it relates to dx and so defines the mean differential path length of p1 to p2. Since dx is freely adjustable, handling and construction considerations are the main criteria for the actual size of dimension M. As stated before, dimension L which is defined by the distance XY, is chosen simply to ensure that the projection points can be sufficiently discriminated by the photosensor array 18. Dimensions X and L are therefore only so labelled as to facilitate the description of the device. For example, successful devices have been constructed with dimension M as small as 0.05 mm and as large as 1 mm. The CCD photosensor array used in the prototype's construction was of sufficient resolution to allow dimension L to be less than 10 mm, and in practice any commercial camera-type CCD array can be used at this dimension of L.

Note that the lateral displacement of the replay beam is very small with respect to beam diameter. The interaction of the two beams from the second hologram 2 is constant in terms of wavelength displacement through a wavelength variation of several percent. As the angle of the replay beam is changed, the interaction of the beam with the holograms changes. As the angle increases, more light passes through the grating without interacting. This is so because the differential refractive indices that define the grating are blurred by the passage of light through more than one index of the film, as is crudely represented in FIG. 1. Since the index is defined by the actual atomic density averaged through the path of a ray, this density varies over a very small scale. The result of this is that the probability of the cancellation of the beam changes from an absolute maximum defined by the peak efficiency of the hologram to a minimum of near random distribution. The output beam in the non-cancelled condition remains polarized but is reduced in coherence from the initial laser incident beam. The loss of coherence is unlikely to be a problem except in applications where a long range projection of over two million wavelengths is needed. Within one million wavelengths, focusing can be achieved within a reasonable approximation of the diffraction limit.

Note also that as the initial hologram passes a wave through the diffraction path or the non-diffraction path (depending only on the random chance of a specific photon passing through a polymerised portion of the hologram), a considerable portion of the delayed beam might be expected to consist of photons that would lack coherent partners taking the alternative path. In practice, the so called quantum entanglement of photons emitted from a laser source extends over a far greater volume of any laser source than had been previously thought. This results in the unexpected tendency of the photons passing through the device to self select into pairs, one taking the delayed path and one the short path. Without this effect the expected level of cancellation in the described device would be of the order of 70%. The actual cancellation measured is often greater than 98%.

That the effect is truly cancellation rather than some form of absorption is readily determined by measuring the temperature of an element used to intercept a laser beam of known power. If the reduction of the beam intensity were due to absorption, then the temperature of the element would rise proportionately to the energy intercepted whereas in the case of cancellation, no temperature rise would be expected. Careful measurements show that no such temperature rise occurs, indicating that the 98% reduction in the beam intensity is indeed due to cancellation alone.

Given the photon entanglement noted above, a practical maximum cancellation for room temperature experiments has been found to be approximately 98%. This may be improved in controlled temperature applications and may be reduced if the environmental temperature must vary by more than ten degrees Celsius. The apparatus is capable of remaining stable at power densities of greater than 500 mW proving that the observed effect is true collinear cancellation (If the effect was caused by some misunderstood absorption phenomenon, the power would be absorbed and the element would melt as explained above).

The optical device as herein described serves a purely practical application as an attenuator for high powered lasers. Simply putting a shutter across a high powered laser beam is not possible since the beam simply burns through. The above device can intercept a laser beam of any power and reduce its intensity by 98% without itself absorbing any energy. A practical experiment with a beam of 500 mW has been conducted. The power density of the beam being 312 W/cm$^2$, the change in temperature was equivalent to only 0.1 percent of the incident power.

Another simple application of the optical device would be the production of a spatial filter. A conventional spatial filter consists of a pin hole through which a laser is projected. Since the circumference of the hole is subject to the full power of the laser beam, the hole tends to burn away in a short time. To overcome this problem, an optical device in accordance with the above-described invention, could be made for the particular laser and then a pinhole drilled through it. When the laser beam is directed at the pinhole, rather than absorbing the radiation at the edge of the hole as in a conventional pinhole, all the light that failed to pass through the pinhole would simply be cancelled.

This optical device also makes possible the construction of an achromatic optical lens whereby the lens would comprise the holographic diffraction gratings and refractive elements interrelated in the manner disclosed in the specification. In practice, a single holographic/refractive lens could not cover the entire optical spectrum. However, a group of such devices could cover the entire optical spectrum. Although the use of photopolymers as described above is the presently preferred method of implementing the invention, this may be done in other ways. Photographic type metal-based emulsions, such as silver halide may be used to construct the holograms. however, the efficiency of an optical device utilizing silver halide holograms would be greatly reduced and a much more powerful laser would be needed to achieve as good a result as would be realized utilizing photopolymer holograms and a low powered laser. An emulsion may be used in conjunction with a photopolymer to set the holographic efficiencies by controlling the emulsion grain size. Alternatively, the holographic elements may be formed by photo exposure of emulsion layers, or by pressed elements produced from photographic masters.

The invention has been described hereinabove with reference to the use of a pair of holographic diffraction gratings. It would in principle be possible to achieve the benefits of the invention by using different forms of diffraction grating (or other optically dispersive elements) separated by an intermediate member of a chosen refractive index.

Further modifications may be made to the foregoing embodiments within the scope of the present invention.

I claim:

1. A method of producing an optical element comprising:

providing a first hologram and a second hologram;

providing a photopolymer;

adjusting the refractive index of the photopolymer by polymerisation until said refractive index reaches a value determined by empirically determined values of said first and second holograms; and securing the polymerised photopolymer between said first and second holograms to form said optical element.

2. The method of claim 1, in which said first and second holograms have the same diffraction grating and the same refractive index; said first hologram has an efficiency half that of said second hologram; and said refractive index is empirically determined by positioning one of said holograms in a mixed beam of collinear light consisting essentially of two different wavelengths such that two diffracted beams exit the hologram at different angles, and measuring the distance between the projection points of said two diffracted beams at a predetermined distance from said one of the holograms.

3. The method of claim 2, in which the refractive index of the photopolymer is adjusted by the steps of:

(i) creating an assembly consisting of said one hologram, said photopolymer, and a second photopolymer having the same average refractive index as said holograms;

(ii) exposing said assembly to said mixed beam thereby producing two refracted beams and two corresponding projection points;

(iii) adjusting the refractive index of said first-mentioned photopolymer by polymerisation thereby altering the distance between said two refracted beams; and (iv) stopping the polymerisation when the projection points of the said refracted beams are the same as the projection points of said two diffracted beams.

4. A method of producing an optical device, the method comprising the steps of:

a) providing a first and a second hologram, each hologram having the same diffraction grating such that both holograms induce the same wavelength-dependent angle of diffraction and each hologram having the same average refractive index, said first hologram having an efficiency half the efficiency of said second hologram;

b) positioning one of said holograms in the path of a mixed beam of collinear light consisting essentially of two different wavelengths such that two diffracted beams exit the hologram at different angles to project onto a photo-sensor array some distance L from the exit side of the hologram;

c) measuring the distance between the projection points of the two diffracted beam;

d) providing a first photopolymer having a chosen initial refractive index and a long dimension equal to L;

e) providing a second photopolymer having the same average refractive index as said holograms;

f) substituting the second photopolymer at the position of the hologram with respect to said mixed beam;

g) positioning said first photopolymer between the photosensor array and the second photopolymer so its long dimension L is perpendicular to the array;

h) activating said mixed beam so that two refracted beams project from said first photopolymer onto said array;

i) adjusting the refractive index of the first photopolymer by polymerization such that the distance between the projection points of the refracted beams changes;

j) stopping polymerisation at that point where the displacement between the projection points of the refracted beams measures the same as the displacement measured between the projection points of the diffracted beams;

k) removing said second photopolymer and securing it to said first hologram;

l) positioning said second hologram at the face of the first photopolymer opposite the first hologram;

m) directing an incident optical beam having a narrow spread of wavelengths around a center wavelength at said first hologram such that two exit beams are produced by said second hologram;

n) adjusting said second hologram until the exit beams maximally overlap and a position of maximum cancellation is achieved; and o) securing said second hologram to the first photopolymer at said adjusted position.

* * * * *